United States Patent [19]

Nakada et al.

[11] Patent Number: 4,900,465
[45] Date of Patent: Feb. 13, 1990

[54] PROCESS FOR PREPARING MAGNETIC CARBON BLACK

[75] Inventors: Toshio Nakada; Fumio Takemura; Yoshihito Sema; Kazuhito Kataoka, all of Gotenba, Japan

[73] Assignee: Tokai Carbon Co., Ltd., Tokyo, Japan

[21] Appl. No.: 154,259

[22] Filed: Feb. 10, 1988

[30] Foreign Application Priority Data

Feb. 13, 1987 [JP] Japan .................. 62-29543
Feb. 23, 1987 [JP] Japan .................. 62-37886
Aug. 12, 1987 [JP] Japan .................. 62-199906
Oct. 7, 1987 [JP] Japan .................. 62-251699

[51] Int. Cl.$^4$ .............................. C04B 35/52
[52] U.S. Cl. .................. 252/62.55; 252/62.51; 252/62.56
[58] Field of Search ............... 252/62.51, 62.55, 62.56

[56] References Cited

U.S. PATENT DOCUMENTS

| | | | |
|---|---|---|---|
| 3,213,026 | 10/1965 | Jordan et al. | 252/62.55 |
| 3,431,205 | 3/1969 | Otto | 252/62.55 |
| 3,448,052 | 6/1969 | Otto | 252/62.51 |

FOREIGN PATENT DOCUMENTS 1191505  4/1965  Fed. Rep. of Germany ... 252/62.51

Primary Examiner—Jack Cooper
Attorney, Agent, or Firm—Armstrong, Nikaido, Marmelstein, Kubovcik & Murray

[57] ABSTRACT

Magnetic carbon black, a process for preparing the same, and a method of modifying magnetic carbon black are provided. The magnetic carbon black is prepared by process A in which when a hydrocarbon is supplied into a high temperature combustion gas stream formed by combustion of a fuel to prepare carbon black, an organic transition metal compound is supplied together with the hydrocarbon and, at the same time, an oxygen gas is supplied from the circumference of the hydrocarbon, process B in which a transition metal compound is supplied together with a hydrogen gas on the downstream side of the supply position of the hydrocarbon, and process C in which a hydrocarbon is supplied into a high temperature combustion gas stream on both the upstream side and the downstream side and a transition metal compound is supplied from a position between the supply positions of the hydrocarbon. The average particle diameter of the magnetic fine particle and the average particle diameter of carbon black in the magnetic carbon black prepared by process A are 30 nm or more and 20 nm or less, respectively. The magnetic characteristics of the magnetic carbon black can be enhanced by heating the magnetic carbon black in a non-oxidizing atmosphere at 400° to 900° C.

13 Claims, 2 Drawing Sheets

PROCESS FOR PREPARING MAGNETIC CARBON BLACK

BACKGROUND OF THE INVENTION

This invention relates to carbon black having excellent electrical properties, particularly excellent magnetic properties, a process for preparing the same, and a method of modifying magnetic carbon black.

Hitherto, carbon black has been widely used as a rubber reinforcing filler in the field of tires and various industrial rubber products as well as in the fields of colorants of a printing ink, a paint, etc. and functional materials.

Since carbon black comprises carbonaceous matter and has a certain degree of electrical conductivity, it is also used as a filler for the purpose of imparting electrical conductivity. However, carbon black in itself has no magnetic performance.

Therefore, if the magnetic performance could be imparted to carbon black, magnetic rubbers, magnetic resins, etc. would be produced by imparting to composite rubbers and resins a magnetic function in addition to various functions inherent in carbon black, such as reinforcing power, tinting power, and electrical conductivity. These products are expected to be useful in the fields of electronic, mechanical and chemical industries.

Further, in the fields of inks and pigments as well, it is expected that carbon black is advantageously used for applications, such as magnetic ink, magnetic pigment, and toner for electrophotography, without spoiling blackness inherent in carbon black.

There are various kinds of carbon black according to particle diameters. In general, carbon black has a chain structure comprising spherical particles having an average particle diameter of 10 to 200 nm which have been fused and secondarily agglomerated.

Also the particle diameters have a wide distribution according to the average particle diameter Further, the density of carbon black is about 1.8, i.e., greatly differs from that of the metal.

Therefore, in a method in which carbon black and fine powder of a magnetic metal are secondarily mixed, it is difficult to homogeneously and highly disperse a magnetic metal having a size of the order of micron.

Further, a method in which carbon black and fine powder of a magnetic metal are mixed with a matrix material such as rubber, resin, paint, or ink is also accompanied by separation in the step of mixing, which makes it impossible to stably attain a homogeneous and high degree of dispersion.

Moreover, a high degree of magnetic property cannot be imparted to carbon black when carbon black and the fine powder of a magnetic metal are simply mixed by mechanical means and dispersed in each other, because no fine powder of a magnetic metal is immobilized on carbon black in such a state.

Meanwhile, as a process for preparing carbon black having a magnetic property, Japanese Patent Publication No. 39-25277 discloses a method of supplying an additive containing Fe, Ni, and Co into a reaction zone where carbon black is produced from a hydrocarbon as a starting material. This patent publication describes that the metallic component which has been supplied in the reaction zone where carbon black is produced is converted into a magnetic nucleus, which is in turn uniformly and closely bonded to carbon black present in the nascent state to form a product having a permanent magnetic property.

Further, this patent publication describes that the magnetic nucleus has a size similar to that of carbon black particles and is possibly a metal having a unique physical shape which is sufficiently and closely mingled with or bonded to carbon black particles.

Moreover, this patent publication describes that the resulting carbon black pigment composition contains at least one element selected from among Fe, Co, and Ni in an amount of about 100 to 300,000 parts by weight per 1,000,000 parts by weight of carbon black.

However, no elucidation is made in this prior art on the particle diameters of carbon black and magnetic fine particles and the relationship between these particle diameters and the magnetic property which the magnetic carbon black has.

SUMMARY OF THE INVENTION

The present invention has been completed based on a finding that excellent magnetic properties can be imparted to carbon black through a study on the relationship between the particle diameter of carbon black and that of magnetic fine particles on one hand and the magnetic property of the magnetic carbon black on the other hand and a study on the conditions under which the magnetic fine particles are supplied into a carbon black reaction furnace Accordingly, the first object of the present invention is to provide magnetic carbon black comprising a magnetic fine particle and a carbon black particle fused and bonded thereto and a process for preparing the same.

The second object of the present invention is to provide a process for preparing magnetic carbon black comprising a magnetic fine particle which has been uniformly dispersed and trapped in the structure of carbon black.

The third object of the present invention is to provide a process for preparing magnetic carbon black having excellent magnetic performance in addition to properties inherent in carbon black The above-described objects of the present invention can be attained through the study on the position from which at least one compound selected from among Fe, Co, and Ni as raw material is supplied into a combustion gas and a study on the atmosphere of the combustion gas around the position of the supply of this compound.

The magnetic performance can be further enhanced by heating the resulting magnetic carbon black in a non-oxidizing atmosphere

DESCRIPTION OF THE PREFERRED EMBODIMENTS

Figure 1:
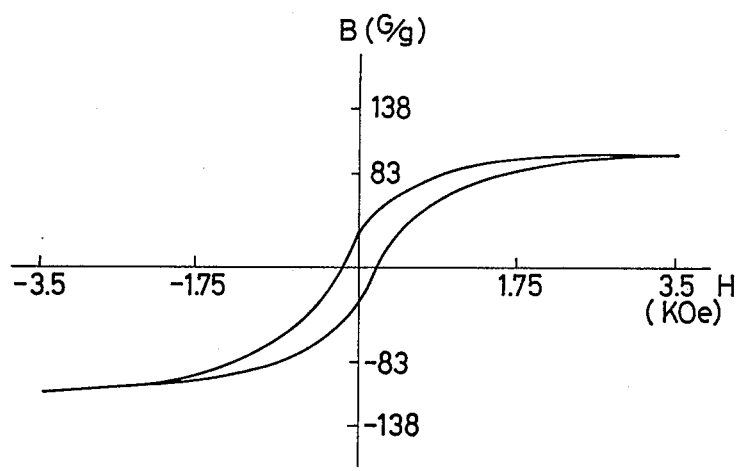
FIG. 1 is a curve showing the magnetization characteristics of magnetic carbon black (Run No. 1) obtained by the process A for preparing magnetic carbon black according to the present invention.

In general, carbon black is prepared by a process which comprises completely burning a fuel, such as a low-boiling hydrocarbon oil or a natural gas, to form a high temperature combustion gas stream, supplying a hydrocarbon as the starting material of carbon black into the high temperature combustion gas stream to convert the starting material into carbon black. The hydrocarbon as the starting material causes a rapid thermal decomposition reaction due to the presence of the high temperature combustion gas stream. This leads to the formation of nuclei through a complicated polycondensation reaction, and a chain structure is formed through the growth and agglomeration of the nuclei.

When the hydrocarbon as the starting material is injected into the high temperature combustion gas stream which is an oxidizing atmosphere, it is partly burnt and, at the same time, undergoes rapid decomposition under a reducing atmosphere, thereby causing the conversion into carbon black.

More particularly, it has been explained that with respect to the mechanism of formation of carbon black, carbon black is formed through the following steps.

The hydrocarbon as the starting material produces a polycyclic aromatic substance through a thermal decomposition condensation, which is in turn condensed into droplets with an increase in the molecular weight thereof, thereby forming solid carbon-like polycrystals. These are agglomerated through a physical action into nuclear particles, which are further agglomerated and grown to form primary particles and secondary particles (aggregate).

The forming process of carbon black is generally explained by two stages, i.e., growth of nuclei in the initial stage of the reaction and growth of particles in the latter stage of the reaction.

For example, according to K. R. Dohmen & N. N. McRee (Rubber World, May, 1974, p. 6) etc., in the forming process, polyacetylene, polycyclic aromatic compounds, and other active hydrocarbons are formed in a very early stage of the thermal decomposition reaction, and these then undergo a radical reaction to form carbon black nuclear particles having a size of 40 to 50 Å. These reactions require a reaction energy of 100 Kcal/mol or more with respect to a usual starting material of carbon black, and a reaction energy of less than the above-mentioned value brings about neither increase nor formation of nuclear particles. In this stage, oxygen in the system is sufficiently supplied, and the reaction energy is supplied as a high thermal energy accompanied by partial combustion of the starting material.

The carbon source which remains in the system after formation of the nuclear particles then enters the stage of growth of particles in which it accumulates and grows as carbon species from the gaseous phase on the surface of the particles of the formed carbon black. These reactions take place at an activation energy of 30 to 50 Kcal/mol which is lower than that of the nuclear particle formation zone and will continue in a non-oxidizing atmosphere after formation of carbon black particles at a relatively low temperature. Then, fundamental particles and aggregates of final carbon black are formed depending upon the residence time leading to the cessation of the water cooling reaction in the reaction system.

According to the present invention, the magnetic carbon black is prepared by the following processes A, B, and C which will now be described.

In the process A for preparing the magnetic carbon black of the present invention, a hydrocarbon as a starting material of carbon black and an organic transition metal compound are injected into a high temperature combustion gas stream having a velocity of 150 m/sec or more, and an oxygen gas is supplied from the circumference of the starting hydrocarbon.

The organic transition metal compound undergoes rapid thermal decomposition in the high temperature combustion gas to form spherical magnetic fine particles having a diameter of about 5 to 100 nm.

The magnetic fine particles are trapped and immobilized among the particles of the chain structure of carbon black. Further, part of the magnetic fine particles are fused and bonded to carbon black in the form of cementite etc. or agglomerated and united with the fundamental particles of carbon black to stably and uniformly disperse them in carbon black for immobilization. With respect to the form of dispersion, when the particle diameter of carbon black is larger than that of the magnetic particles in the step of formation of the nuclei through a polycondensation reaction caused by the thermal decomposition of the starting hydrocarbon and the step of the formation of carbon black through growth and agglomeration of the nuclei, the formation nuclei which are a fundamental constituent of the carbon black particles tend to agglomerate with magnetic fine particles, i.e., decomposition product of the metal compound and, at the same time, to be immobilized within the carbon black particles with the advance of the gaseous phase carbonization reaction which is causative of the growth of the carbon black particles.

On the other hand, in an atmosphere having a higher temperature, the thermal decomposition of the starting hydrocarbon is accelerated, which leads to the formation of carbon black having a smaller particle diameter. In this case, the magnetic particles tend to be immobilized in an exposed state through the fusing and bonding to the carbon black particles.

Therefore, in the process A according to the present invention, in order to obtain carbon black having a smaller particle diameter, the oxygen gas is supplied from the circumference of the position for supply of the starting hydrocarbon. Specifically, in the process A according to the present invention, a commonly used carbon black production device is used, and a fuel and air are supplied into a wide combustion chamber located at the head of a furnace to burn the fuel, thereby forming a high temperature combustion gas. This high temperature combustion gas flows through a narrow reaction chamber which has been connectively provided on the same axis as that of the wide combustion chamber.

The hydrocarbon as the starting material of carbon black and an organic transition metal compound are injected into the high temperature combustion gas stream having a velocity of 150 m/sec or more through this narrow reaction chamber to form magnetic carbon black through thermal decomposition.

Further, in the process A according to the present invention, an oxygen gas is supplied from the circumference of the position for supply of the starting hydrocarbon. Subsequently, the formed gas stream containing magnetic carbon black flowing through the large-diameter reaction chamber is sprayed with water to allow the gas stream to cool, thereby stopping the reaction.

The formed gas stream containing the cooled magnetic carbon black is discharged outside the furnace, and the magnetic carbon black is then separated and collected by a suitable device such as a bag filter. The injection of the starting hydrocarbon into the high temperature combustion gas stream which flows down through the narrow reaction chamber at a velocity as high as 150 m/sec causes rapid thermal decomposition of the starting hydrocarbon in the highly disturbed gas stream, which makes the particle diameter of the resulting carbon black small. Further, the addition and supply of an oxygen gas from the circumference of the starting hydrocarbon further promotes the combustion and thermal decomposition reaction, thus leading to the formation of carbon black having a small particle diameter. On the other hand, the magnetic fine particles formed by the thermal decomposition of the organic transition metal compound can be controlled so as to have a particle diameter larger than that of the carbon black because the magnetic fine particles are less susceptible to the thermal decomposition conditions.

Preferred examples of the organic transition metal compound include metallocenes, such as ferrocene, cobaltocene, and nickelocene or carbonyl complex compounds of Fe, Co, and Ni. These compounds easily undergo thermal decomposition and are smaller in variation of the particle diameter of the decomposition product than that in the case of the carbon black. The organic transition metal compound is supplied into the narrow reaction chamber in such a state that it is dissolved or dispersed in the starting hydrocarbon.

The X-ray diffractometry of the magnetic fine particles reveals that the chemical composition of the magnetic fine particles comprises, e.g., FeO, $Fe_3O_4$, $\gamma$-$Fe_2O_3$, $\alpha$-Fe, etc. when an iron compound is used.

This composition can be controlled by varying the thermal decomposition conditions in the reaction furnace.

Further, when carbon black is formed by making use of, e.g., an iron compound in combination with a cobalt compound as the organic transition metal compound, carbon black containing Fe/Co alloy particles highly dispersed therein is obtained. That is, in this case, it is possible to impart more functional magnetic properties to carbon black. Thus, it is also possible to control the magnetic property.

Examples of the starting hydrocarbon include various organic hydrocarbons, such as benzene, toluene, xylene, and styrene; a coal tar oil; and a bottom oil of ethylene cracking.

A low-boiling hydrocarbon oil, such as kerosine, a heavy oil or a natural gas is used as the fuel.

The magnetic carbon black of the present invention thus produced comprises carbon black and a magnetic fine particle composed of at least one metal selected from the group consisting of Fe, Co, and Ni and an oxide of a metal, said magnetic fine particle being homogeneously dispersed and immobilized in said carbon black.

It is noted that the average particle diameters of the carbon black and the magnetic fine particle are 20 nm or less and 30 nm or more, respectively.

As mentioned above, in the magnetic carbon black of the present invention, the average particle diameter of the formed carbon black is larger than the average particle diameter of the magnetic particles. On the other hand, the average particle diameter of the magnetic fine particles are relatively large.

Therefore, in the formed magnetic carbon black, the magnetic fine particle tends to be immobilized in an exposed state through the fusing and bonding thereof to the carbon black particles. This makes it possible to impart an advanced magnetic property to carbon black by virtue of the strong magnetic action of the magnetic fine particle which has been immobilized in an exposed state.

The process B for preparing magnetic carbon black of the present invention will now be described. In the process B, when a starting hydrocarbon is injected into a high temperature combustion gas stream formed by the combustion of a fuel to form carbon black in the same manner as that of the process A, a transition metal compound is injected into the downstream zone of the supply portion of the starting hydrocarbon, and a hydrogen gas is also supplied simultaneously with the supply of the transition metal compound.

That is, immediately after the thermal decomposition of the starting hydrocarbon, particularly the formation of nuclear particles of carbon black, the transition metal compound is injected into an atmosphere containing no free oxygen to cause thermal decomposition, thereby forming a magnetic fine particle composed of a magnetic transition metal or its compound.

This magnetic fine particle coexist with a carbon black nuclear particle in such a state that it is trapped in the carbon black nuclear particle through agglomeration. This particle is then incorporated into and united with the structure of the carbon black particle through the growth of the particle by a gaseous phase carbonization reaction of the carbon source in the system. Thus, the magnetic fine particle is stably immobilized within the fundamental particle of carbon black and an aggregate of the particles in such a state that it is covered with a carbon layer.

Therefore, when the transition metal compound is injected into an oxidizing atmosphere containing free oxygen, the tendency for the decomposition produce, i.e., magnetic fine particle, to be immobilized within the fundamental particle of carbon black and the aggregate of the particle through the coexistence with the carbon black is remarkably decreased.

In order to inject the transition metal compound into an atmosphere containing no free oxygen, it is necessary that the transition metal compound be injected into the downstream zone of the supply portion of the starting hydrocarbon. The simultaneous supply of a hydrogen gas enables quick consumption of the remaining free oxygen through a reaction. The amount of the hydrogen gas supplied is suitably determined based on the conditions of the reaction for formation of carbon black. Further, the process B according to the present invention can be attained by ejecting a starting hydrocarbon from at least two supply portions provided in the direction of the axis of the furnace to consume free oxygen in the system through a reaction by combustion of the starting hydrocarbon supplied from the first supply portion provided on the upstream side of the reaction furnace and ejecting a transition metal compound together with the starting hydrocarbon etc. supplied from the second supply portion or a subsequent supply portion or separately from the starting hydrocarbon.

The transition metal compound used in the process B is at least one compound selected from the group consisting of organic transition metal compounds, such as metallocenes and carbonyl complex compounds, inorganic acid salts, such as chlorides, nitrates, and sulfates, and organic acid salts, such as acetates and oxalates, of Fe, Co, and Ni. These transition metal compounds are dissolved or dispersed in a suitable solvent and then injected into a reaction furnace. In the dispersion of them, it is preferred that a small amount of a surfactant be used because a stable dispersion can be obtained thereby. When the starting hydrocarbon is ejected from at least two supply portions, the transition metal compound may be dissolved or dispersed in the starting hydrocarbon supplied from the second supply portion or a subsequent supply portion and then injected into the reaction furnace. When a metallocene or a carbonyl complex compound is used, it may be injected in a vaporized state into the reaction furnace. Further, the combined use of, e.g., an iron compound and a cobalt compound as the magnetic transition metal compound enables the formation of carbon black on which a magnetic fine particle comprising an Fe/Co-base alloy has been immobilized, i.e., makes it possible to impart more functional magnetic properties to carbon black. With respect to the fuel and the starting hydrocarbon, the description about the process A holds as it is to the process B.

Various characteristics of the carbon black on which this magnetic fine particle has been uniformly immobilized can be controlled by generally accepted known technical means.

According to the process B for preparing magnetic carbon black of the present invention, the magnetic fine particle which is a decomposition product of a transition metal compound coexists wit a carbon black nuclear particle in such a state that it is agglomerated with and trapped in the carbon black nuclear particle and, at the same time, is grown into a carbon black particle. Therefore, the magnetic fine particle is homogeneously dispersed and, at the same time, stably immobilized within the fundamental particle of carbon black and the aggregate of the particle.

In the process C for preparing magnetic carbon black of the present invention, a starting hydrocarbon is spray supplied into a high temperature combustion gas stream formed in a wide combustion chamber located at the head of a furnace from both the upstream and downstream zones of the high temperature combustion gas stream, and a transition metal compound is spray supplied from a position between the supply positions of the starting hydrocarbons.

The starting hydrocarbon which has been added on the upstream side first consumes free oxygen contained in the combustion gas stream through a reaction. The starting hydrocarbon is partly burnt and, at the same time, undergoes rapid decomposition to form a nuclear particle which is further agglomerated to form a primary particle.

The transition metal compound is ejected from the downstream side of the position for spray supply of the starting hydrocarbon and thermally decomposed in a high temperature gas stream containing no free oxygen, thereby forming a fine particle of a metal. When the transition metal compound is supplied after it is dissolved in a suitable solvent, such as methanol or ethanol, and then atomized with an inert gas or a reducing gas, such as Ar, $N_2$ or $H_2$, a magnetic metal having a smaller particle size can be obtained. The metallic fine particle thus formed is uniformly fused and bonded to the carbon black primary particle in a micro state to form an integral structure. With respect to the position for supply of the transition metal compound through injection, there is no particular limitation as far as the position is located on the downstream side of the position for supply of the starting hydrocarbon on the upstream side and, at the same time, located in a reducing atmosphere having a high temperature in which the nuclear particle and primary particle have been formed.

Further, the surface layer comprising a primary particle of carbon black and a fine particle of a magnetic metal integral therewith which has been already formed is covered in the step of the thermal decomposition of the starting hydrocarbon which has been spray supplied from the downstream side zone to form a secondary particle (aggregate) of carbon black, which is in turn converted into carbon black.

It is preferred that the amount of the starting hydrocarbon injected on the upstream side be small as far as the amount is sufficient for consumption of free oxygen contained in the high temperature combustion gas and for formation of a primary particle of carbon black.

Various saturated or unsaturated aromatic and aliphatic hydrocarbons can be used as the starting hydrocarbon in the present invention. Particularly, gaseous unsaturated hydrocarbons, such as ethylene or propylene, and lower alcohols, such as ethanol, propanol or pentanol, which exhibit a high burning rate and a high thermal decomposition rate are preferably used.

Although various compounds containing at least one metal selected from among Fe, Co, and Ni as described above with respect to the process B according to the present invention can be used as the transition metal compound, inorganic compounds, such as chlorides, nitrates, or sulfates, are preferable from the standpoint of cost.

The same fuel as that used in the process A may be used in the process B.

According to the process C for preparing magnetic carbon black of the present invention, the fine particle of a magnetic metal which is a decomposition product of the magnetic transition metal compound is uniformly dispersed in a micro state in a primary particle of carbon black formed by the thermal decomposition of the starting hydrocarbon which has been spray supplied in the upstream zone of a high temperature combustion gas and then fused and bonded thereto. In this case, the melting point of the metallic fine particle is lowered due to the presence of the primary particle of carbon black, which further contributes to an improvement in the sphericity and a reduction in the fine particle size.

Further, the surface layer comprising mixed fine particles composed of a primary particle of carbon black and a fine particle of a magnetic metal already formed are covered in the step of the thermal decomposition of the starting hydrocarbon which has been supplied in the downstream zone, thereby forming a secondary particle (aggregate) of carbon black. Thus, a fine particle of a magnetic metal is stably immobilized within a fundamental particle of carbon black to form an integral structure.

The method of modifying magnetic carbon black according to the present invention comprises heat treating magnetic carbon black obtained by the abovementioned processes A to C or the conventional process at a temperature of 400° to 900° C. in a non-oxidizing atmosphere.

The magnetic carbon black which has been prepared by any method may be used as the starting material. In general, a fine particle of a magnetic metal is uniformly dispersed in a micro state in a primary particle of carbon black and fused and bonded thereto. The surface layer of the mixed fine particles is covered to form a secondary particle (aggregate). In this structure, the fine particle of a magnetic metal is stably immobilized within carbon black to form an integral structure. In this case, the metallic fine particle mostly exists in the form of various oxides and partly exists in the form of a metal in a reduced state.

When such magnetic carbon black is heat treated in a non-oxidizing atmosphere, the carbon black which is present on the surface layer and within the magnetic carbon black is bonded to oxygen contained in the oxide, thereby reducing the metallic fine particle to a metallic state.

This reduction reaction occurs on the solid interface between the carbon black and the fine particle of the magnetic metal. Since in the magnetic carbon black, the carbon black and the fine particle of the magnetic metal are homogeneously dispersed in each other, the reduction reaction smoothly proceeds.

The heat treatment is conducted by a method which comprises placing a composite particle in a heat-resistant container, such as a crucible made of graphite, putting the container in a heating oven through which a gas, such as Ar, He or $N_2$, is passed so as to maintain a non-oxidizing atmosphere, and heating the composite particle at 400° to 900° C. for a suitable period of time.

The metallic fine particle is effectively reduced from the state of an oxide to the state of a metal by this heat treatment by virtue of the reducing action of the carbon black present around the particle. In this case, the melting point of the fine particle of the magnetic metal is lowered due to the presence of carbon black. The metallic fine particles are fused to each other upon being molten in the heat treatment and grown into a large particle. When the metallic fine particle is grown into a large particle, the magnetic carbon black is easily oxidized in an oxidizing atmosphere, which leads to the lowering and destabilization of the magnetic performance. In order to prevent the growth into a large particle, it is necessary that the heat treatment be conducted at a temperature of 900° C. or below for the purpose of suppressing the occurrence of the fusion. When the temperature of the heat treatment is below 400° C., the carbon black exerts no sufficient reducing action.

The addition of preferably a hydrogen gas to the non-oxidizing atmosphere composed of a non-oxidizing gas, such as Ar, He, or $N_2$, further promotes the reduction reaction.

It is preferred that the fine particle of the magnetic metal be at least one metal selected from among Fe, Co, and Ni which are metals having excellent magnetic performance.

In the method of modifying magnetic carbon black according to the present invention, when magnetic carbon black comprising carbon black and a fine particle of a magnetic metal is heat treated in a non-oxidizing atmosphere, carbon black functions as a reducing agent, and the metallic fine particle is converted from the state of an oxide to the state of a metal which is a reduced state exhibiting excellent magnetic performance. Further, since the heat treatment is conducted at a low temperature, the metallic fine particle is not molten, which prevents the fine particle from growing into a large particle, thus maintaining the state of fine particle.

Therefore, the fine particle of the magnetic metal in an oxidized state is reduced as it is to a metallic state exhibiting excellent magnetic performance, which enables the existence of the fine particle in a stable state. The modified magnetic carbon black is very useful as a magnetic material which has enhanced magnetic properties and can stably exist even in an oxidizing atmosphere.

EXAMPLE 1

(process A for preparing magnetic carbon black):

Magnetic carbon black was prepared by making use of a reaction furnace comprising a wide combustion chamber equipped with an air supply duct and a fuel burner, a narrow reaction chamber equipped with a nozzle for ejecting a hydrocarbon as a starting material of carbon black, and a wide reaction chamber which are connectively provided (narrow reaction chamber: a diameter of 30 mm and a length of 200 mm; wide reaction chamber a diameter of 80 mm and a length of 1500 mm) under conditions as shown in Table 1. An organometallic compound was dissolved in the starting hydrocarbon or mixed with the starting hydrocarbon in the form of a solution and supplied into the narrow reaction chamber (at a position of 50 mm on the upstream side). An oxygen gas was supplied from the circumference of the starting hydrocarbon ejection nozzle.

TABLE 1

| conditions | Ex. 1 | | | | Comp. Ex. | |
|---|---|---|---|---|---|---|
| | Run No. | | | | | |
| | 1 | 2 | 3 | 4 | 5 | 6 |
| amount of fuel gas ($Nm^3$/hr) | 4.0 | 4.0 | 3.8 | 3.6 | 2.5 | 1.8 |
| amount of combustion air ($Nm^3$/hr) | 95.5 | 95.5 | 90.5 | 86.0 | 60.0 | 43.0 |
| starting hydrocarbon | benzene | creosote oil | styrene monomer | benzene | benzene | styrene monomer |
| amount of supplied starting hydrocarbon (g/hr) | 1970 | 1100 | 2270 | 2400 | 2000 | 2200 |
| feed rate of oxygen gas ($Nm^3$/hr) | 1.05 | 1.05 | 0.95 | 1.05 | — | — |
| flow rate of combustion gas (m/sec) | 173 | 175 | 165 | 155 | 110 | 80 |
| supplied organic transition metal compound | ferrocene | ferrocene | ferrocene | pentacarbonyl iron (ml/H) | ferrocene | ferrocene |
| concentration of organic transition metal compound | 1.5 | 5.5 | 6.5 | 140 | 1.6 | 0.5 |

TABLE 1-continued

| | Ex. 1 | | | | Comp. Ex. | |
|---|---|---|---|---|---|---|
| | Run No. | | | | | |
| conditions | 1 | 2 | 3 | 4 | 5 | 6 |
| (wt %) | | | | | | |

Various characteristics of the magnetic carbon black obtained by the above-mentioned process are shown in Table 2 according to Run Nos. of Table 1.

TABLE 2

| | | Ex. 1 | | | | Comp. Ex. | |
|---|---|---|---|---|---|---|---|
| | | Run No. | | | | | |
| | | 1 | 2 | 3 | 4 | 5 | 6 |
| carbon black | average particle diameter (nm) | 12.0 | 13.0 | 14.0 | 15.0 | 30.0 | 40.0 |
| | particle diameter distribution (nm) | 5.2 | 5.6 | 5.8 | 6.2 | 15.0 | 21.0 |
| magnetic fine particle | average particle diameter (nm) | 33.0 | 30.0 | 40.0 | 37.0 | 35.0 | 30.0 |
| | particle diameter distribution (nm) | 14.0 | 13.0 | 16.0 | 15.3 | 18.0 | 16.0 |
| content of magnetic fine particle in carbon black (wt %) | | 3.0 | 6.0 | 10.0 | 5.0 | 1.5 | 5.0 |
| magnetization charac- teristics | BM (max. magnetic flux density) (G/g) | 104 | 125 | 144 | 115 | 88 | 70 |
| | HM (max. magnetomotive force) (KOe) | 3.5 | 3.5 | 3.5 | 3.5 | 3.5 | 3.5 |
| | HC (coercive force) (Oe) | 178 | 265 | 346 | 220 | 140 | 110 |

As can be seen from Table 2, magnetic carbon black prepared by process A for preparing magnetic carbon black according to the present invention (Run Nos. 1 to 4) meets the following requirements with respect to the average particle diameters of carbon black and the magnetic fine particle constituting the magnetic carbon black: an average particle diameter of carbon black of 20 nm or less and an average particle diameter of magnetic fine particle of 30 nm or more. Further, the magnetic carbon black exhibits very high values of the magnetization characteristics. On the other hand, the magnetic carbon black of comparative examples (Run Nos. 5 and 6) as prepared under such a condition that no oxygen gas is supplied exhibits magnetization characteristics which are remarkably inferior to those of the magnetic carbon black of Run Nos. 1 to 4 because the average particle diameter of carbon black constituting the magnetic carbon black is outside that of the requirements of the present invention (20 nm or less).

Figure 2:
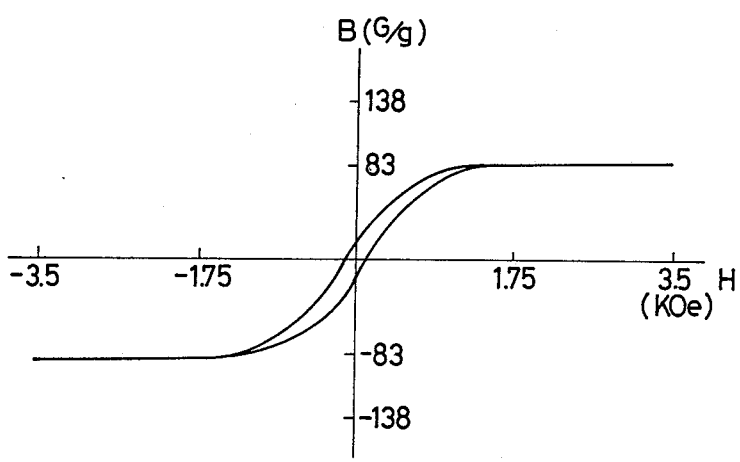
FIG. 2 is a curve showing the magnetization characteristics of magnetic carbon black prepared by a process which does not meet the requirements of the process A (Run No. 5)
Figure 3:
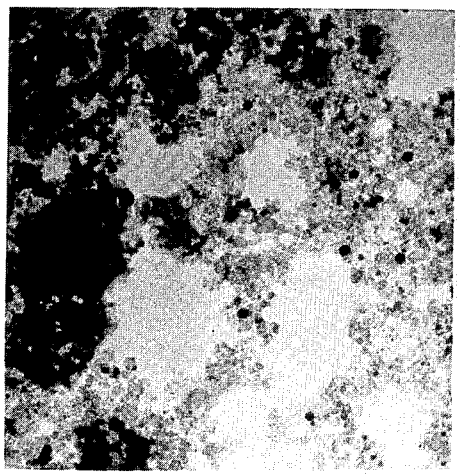
FIGS. 3 and 4 are electron photomicrographs of magnetic carbon black prepared in the above-described Run Nos. 1 and 5, respectively.
Figure 4:
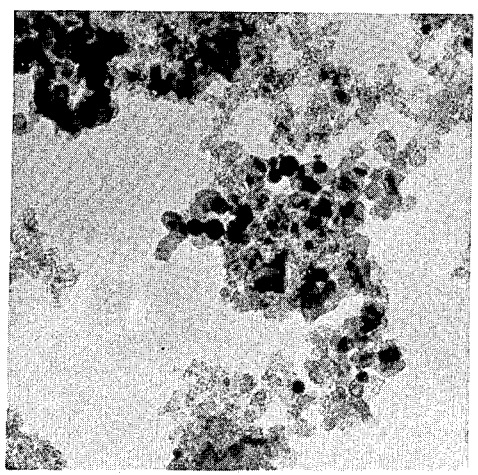

A magnetization characteristic curve (B-H hysteresis loop) for magnetic carbon black of Run No. 1 (an example of the present invention) and a magnetization characteristic curve for magnetic carbon black of Run No. 5 (comparative example) are shown in FIGS. 1 and 2, respectively. Electron photomicrographs (magnification: ×60000) of the same samples as those described above are shown in FIGS. 3 and 4, in which iron particles and iron oxide particles appear dark and small dots, which are surrounded by carbon black particles which appear to be less dark than iron particles and iron oxide particles. These drawings also substantiate that the magnetic carbon black of the present invention is superior in the magnetic performance and particle dispersion to that of the comparative example.

EXAMPLE 2

(process B for preparing magnetic carbon black):

There was installed a reaction furnace comprising a wide combustion chamber (a diameter of 200 mm and a length of 500 mm) provided at the head with a combustion burner having air and fuel supply openings and a starting material ejection nozzle, a narrow reaction chamber (a diameter of 80 mm and a length of 150 mm) coaxialingly connected to the combustion chamber, and a wide reaction chamber (a diameter of 120 mm and a length of 1800 mm) provided subsequently to the narrow reaction chamber, said wide reaction chamber being provided with holes for ejecting reaction stopping cooling water at predetermined positions.

A second starting material ejection nozzle was mounted by insertion on the narrow reaction chamber at a position of 80 mm from the head thereof. Further, a hole for ejecting a transition metal compound was provided in the direction of the furnace axis at a position of 130 mm from the head of the narrow reaction chamber.

Carbon black was prepared by making use of this reaction furnace while controlling the feed rate of each of the starting hydrocarbon, fuel, and air, the position for ejecting cooling water, the amount of water, etc.

Creosote oil and benzene were used as the starting hydrocarbon, and propane was used as the fuel. Further, ferrocene [$Fe(C_5H_5)_2$] and ferrous chloride were used as the transition metal compound.

The whole amount of the starting hydrocarbon was ejected by making use of an argon gas from the first starting material ejection nozzle mounted on the combustion chamber. Ferrocene and ferrous chloride were each injected into the reaction furnace from an ejection nozzle inserted in an ejection hole by making use of an argon gas in the form of a dispersion having a ferrocene concentration of 10 wt % in the case of ferrocene prepared by making use of ethanol as a solvent and by adding a small amount of a surfactant and in the form of an aqueous solution having a ferrous chloride concentration of 20 wt % in the case of ferrous chloride. Simultaneously, a hydrogen gas was supplied at a predetermined proportion from the circumference of the ejection nozzle for the transition metal compound. A comparative example was conducted under conditions such that ferrocene was added and dissolved in creosote oil so as to have a concentration of 1.5 wt % and no hydrogen gas was supplied.

TABLE 3

| production conditions and characteristics | Ex. 2 Run No. No. 7 | Ex. 2 Run No. No. 8 | Comp. Ex. Run No. No. 9 |
|---|---|---|---|
| feed rate of propane (Nm³/hr) | 2.0 | 1.0 | 2.0 |
| amount of combustion air (Nm³/hr) | 52.5 | 25.0 | 52.5 |
| starting hydrocarbon | | | |
| kind | creosote oil | benzene | creosote oil |
| feed rate (g/hr) | 1000 | 900 | 900 |
| transition metal compound | | | |
| kind | ferrocene | ferrous chloride | ferrocene |
| feed rate (ml/hr) | 50 | 40 | — |
| feed rate of hydrogen gas (Nm³/hr) | 2.0 | 1.0 | — |
| characteristics of magnetic carbon black | | | |
| average particle diameter of carbon black (nm) | 50.0 | 40.0 | 35.0 |
| particle diameter of magnetic fine particle (nm) | 20.0 | 28.0 | 35.0 |
| content of magnetic fine particle (wt %) | 0.5 | 1.0 | 2.0 |
| magnetic characteristics | | | |
| BM (max. magnetic flux density) (G/g) | 120 | 150 | 85 |
| HM (max. magnetomotive force) (Koe) | 1.0 | 1.0 | 3.5 |
| HC (coercive force) (Oe) | 30 | 45 | 140 |

Figure 5:
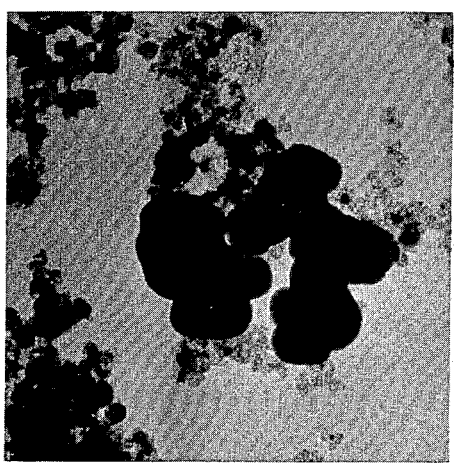
FIGS. 5 and 6 are electron photomicrographs of magnetic carbon black prepared by the process B according to the present invention (Run No. 7) and magnetic carbon black prepared by a process which does not meet the requirements of the process B (Run No. 9), respectively.
Figure 6:
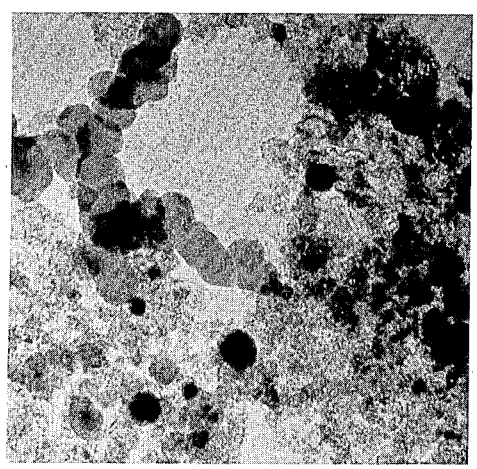

Various characteristics of the magnetic carbon black thus obtained are shown in Table 3 according to the production conditions. Electron photomicrographs of the particle structure of the magnetic carbon black prepared in Run No. 7 (an example of the present invention) and Run No. 9 (comparative example) are shown in FIGS. 5 and 6. In FIG. 5, fine particles of iron appear as dark and small dots, which are surrounded by carbon black particles which appear like gray clouds. In a right-hand half portion of FIG. 6, fine particles of iron appear as dark dots, while in a left-hand half portion of this FIG. 6, carbon black particles are seen to be series of grey dots.

As can be seen from Table 2, the magnetic carbon black of the present invention has excellent magnetic characteristics. Further, it is apparent from the comparison of FIG. 5 with FIG. 6 that in the magnetic carbon black of the present invention most of the fine particles of iron are trapped and immobilized within the carbon black particles while in the comparative example the fine particles of iron are merely fused and bonded to the carbon black particles and, therefore, exposed on the surface thereof.

The X-ray diffractometric analysis revealed that the fine particle of iron comprised α-Fe and further FeO, Fe₃O₄, etc.

EXAMPLE 3
(process B)

Creosote oil was used as the starting hydrocarbon and propane was used as the fuel. The starting hydrocarbon was divided into two parts and separately ejected from the first starting material ejection nozzle and the second starting material ejection nozzle by making use of an argon gas.

The ferrocene dispersion and the pentacarbonyl iron solution (concentration: 95 wt %) used in Example 2 were used as the transition metal compound. They were ejected at the same position as that of Example 2 from the supply nozzle by making use of an argon gas. Simultaneously, a hydrogen gas was supplied from the circumference of the supply nozzle. Various characteristics of the magnetic carbon black thus obtained are shown in Table 4 according to the production conditions.

TABLE 4

| production conditions and characteristics | Ex. 3 Run No. No. 10 | Ex. 3 Run No. No. 11 |
|---|---|---|
| feed rate of propane (Nm³/hr) | 2.0 | 2.0 |
| amount of combustion air (Nm³/hr) | 52.5 | 52.5 |
| amount of supplied starting hydrocarbon (g/hr) | 900 | 900 |
| first starting material ejection nozzle (g/hr) | 540 | 450 |
| second starting material ejection nozzle (g/hr) | 360 | 450 |
| transition metal compound | | |
| kind | ferrocene | pentacarbonyl iron |
| feed rate (ml/hr) | 100 | 15 |
| feed rate of hydrogen gas (Nm³/hr) | 3.0 | 3.5 |
| characteristics of magnetic carbon black | | |
| average particle diameter of carbon black (nm) | 55.0 | 45.0 |
| particle diameter of magnetic fine particle (nm) | 23.0 | 20.0 |
| content of magnetic fine particle (wt %) | 1.5 | 2.0 |
| magnetic characteristics | | |
| BM (max. magnetic flux density) (G/g) | 170 | 185 |
| HM (max. magnetomotive force) (KOe) | 1.0 | 1.0 |
| HC (coercive force) (Oe) | 60 | 70 |

EXAMPLE 4
(process C)

An air supply duct and a fuel burner were mounted on the head of a cylindrical reaction furnace having a diameter of 80 mm and a length of 2500 mm. Starting material spray supply nozzles were inserted in the direction of the axis of the furnace at a position of 200 mm to 800 mm on the downstream side from the head of the furnace, and a transition metal compound ejection nozzle was inserted between these nozzles in the direction of the axis of the furnace.

Magnetic carbon black was prepared in this reaction furnace by making use of a propane gas as the fuel under conditions as shown in Table 5. A comparative example was conducted under conditions such that the starting hydrocarbon was supplied only from the upstream zone of the high temperature combustion gas stream.

Various characteristics of the magnetic carbon black thus obtained are shown in Table 6 according to Run Nos. of Table 4.

prepared was placed in a crucible made of graphite and put in an electric furnace.

Then, the crucible was heated at a predetermined

TABLE 5

|  | Ex. 4 | | | | Comp. Ex. | |
| --- | --- | --- | --- | --- | --- | --- |
|  | Run No. | | | | | |
| production conditions | 12 | 13 | 14 | 15 | 16 | 17 |
| feed rate of propane (Nm$^3$/hr) | 0.5 | 0.5 | 0.5 | 0.5 | 0.5 | 0.5 |
| amount of combustion air (Nm$^3$/hr) | 12.5 | 12.5 | 12.5 | 12.5 | 12.5 | 12.5 |
| starting hydrocarbon | | | | | | |
| upstream zone | | | | | | |
| kind | pentane | pentane | pentane | pentane | benzene | benzene |
| amount of supply (g/hr) | 107 | 89 | 86 | 158 | 302 | 359 |
| downstream zone | | | | | | |
| kind | benzene | benzene | benzene | benzene | — | — |
| amount of supply (g/hr) | 250 | 268 | 346 | 293 | — | — |
| transition metal compound | | | | | | |
| kind | iron chloride | iron nitrate | iron nitrate | iron nitrate | iron nitrate | iron nitrate |
| solvent | ethanol | ethanol | ethanol | ethanol | ethanol | ethanol |
| concentration (wt %) | 10 | 25 | 25 | 25 | 25 | 25 |
| amount of supply (g/hr) | 440 | 417 | 484 | 484 | 450 | 490 |
| atomized gas (Nm$^3$/hr) | 1.0(N$_2$) | 1.0(N$_2$) | 1.5(N$_2$) | 1.5(N$_2$) | 1.0(N$_2$) | 1.5(N$_2$) |

TABLE 6

|  | Ex. 4 | | | | Comp. Ex. | |
| --- | --- | --- | --- | --- | --- | --- |
|  | Run No. | | | | | |
| characteristics | 12 | 13 | 14 | 15 | 16 | 17 |
| characteristics of magnetic carbon black | | | | | | |
| carbon black particle diameter (nm) | 20.0 | 18.5 | 21.5 | 20.5 | 22.0 | 21.0 |
| fine particle of magnetic metal | | | | | | |
| particle diameter (nm) | 16.0 | 17.5 | 18.0 | 17.0 | 28.0 | 35.0 |
| content (wt %) | 15.0 | 17.0 | 13.0 | 16.0 | 10.0 | 13.0 |
| magnetic characteristics | | | | | | |
| BM (max. magnetic flux density) (G/g) | 180 | 220 | 195 | 185 | 130 | 140 |
| HC (coercive force) (Oe) | 125 | 90 | 110 | 120 | 180 | 185 |
| HM (max. magnetomotive force) (KOe) | 3.5 | 3.5 | 3.5 | 3.5 | 3.5 | 3.5 |

The particle diameters of carbon black and the fine particle of magnetic metal were determined by making use of electron photomicrographs, and the content of the fine particle of the magnetic metal was determined by the combustion method.

As can be seen from Table 5, when the content of the fine particle of the magnetic metal is as high as 10 wt % or more, the fine particle of the magnetic metal has a particle diameter smaller than the particle diameter of carbon black and is homogeneously dispersed and immobilized within the secondary particle (aggregate) in the case of Run Nos. 12 to 15, while in Run Nos. 16 and 17 the fine particle of the magnetic metal has a particle diameter larger than the particle diameter of carbon black and is mostly exposed on the surface of the magnetic carbon black.

With respect to the magnetization characteristics, since the content of the fine particle of the magnetic metal is high, the maximum magnetic flux density is increased, which contributes to an improvement in the magnetic performance.

EXAMPLE 5

(method of modifying magnetic carbon black)

Magnetic carbon black comprising carbon black and a fine particle of iron was prepared by the method as disclosed in Japanese Patent Application No. 199906/1987. 4 g of the magnetic carbon black thus temperature while flowing an Ar gas or a mixed gas composed of an Ar gas and a hydrogen gas as the non-oxidizing gas and heat treated for a predetermined period of time. The temperature elevation rate was 250° to 400° C./hr. Thereafter, the crucible was allowed to cool while continuing the flowing of the non-oxidizing gas. After the crucible was allowed to cool to room temperature, the sample was taken out and subjected to the determination of the composition, content, particle diameter, magnetic characteristics, etc. of the fine particle of iron. The results are summarized in Table 7.

In Table 7, Run No. 26 is an original sample which has been subjected to the heat treatment, and Run Nos. 22 to 25 are samples which have been heat treated under conditions outside those of the present invention.

As can be seen from Table 7, samples of Run Nos. 17 to 21 which were heat treated under conditions of the present invention have a composition of the fine particle of iron wherein the oxides, such as $\gamma$-Fe$_2$O$_3$ and Fe$_3$O$_4$, are converted into $\alpha$-Fe as opposed to the original sample. This brings about an increase in the maximum magnetic flux density and contributes to a marked improvement in the magnetic performance. Further, in Run Nos. 17 to 21, the carbon black and the fine particle of iron experienced no change in the particle diameter and maintain the same state of the fine particle as that of the original sample.

TABLE 7

|  | Ex. 5 | | | | | | Comp. Ex. | | | |
|---|---|---|---|---|---|---|---|---|---|---|
|  | Run No. | | | | | | | | | |
|  | 17 | 18 | 19 | 20 | 21 | 22 | 23 | 24 | 25 | 26 |
| heat treatment conditions | | | | | | | | | | |
| temperature (°C.) | 500 | 800 | 800 | 800 | 900 | 300 | 1000 | 1350 | 1550 | — |
| time (hr) | 5 | 5 | 7 | 10 | 5 | 7 | 4 | 4 | 4 | — |
| flow rate of non-oxidizing gas (l/min) | 0.2 Ar | 0.1 $H_2$ 0.1 Ar | 0.2 Ar | 0.2 Ar | 0.2 Ar | 0.2 Ar | 0.2 Ar | 0.1 $H_2$ 0.1 Ar | 0.2 Ar | — |
| composition of magnetic fine particle*[1] | | | | | | | | | | |
| $\gamma$-$Fe_2O_3$ (%) | 28 | — | — | — | — | 30 | 10 | — | — | 32 |
| $Fe_3O_4$ (%) | 40 | 15 | 28 | — | 40 | 70 | 40 | 30 | — | 53 |
| M—Fe (%) | 32 | 85 | 72 | 100 | 60 | — | 50 | 70 | 100 | 15 |
| content of magnetic fine particle*[2] (wt % based on carbon black) | 18.2 | 18.0 | 18.3 | 17.5 | 17.7 | 18.1 | 17.7 | 18.3 | 17.3 | 18.1 |
| particle diameter of carbon black (nm)*[3] | 21.2 | 20.9 | 21.8 | 21.2 | 21.7 | 21.5 | 20.9 | 20.8 | 21.7 | 21.0 |
| particle diameter of magnetic fine particle (nm)*[3] | 18.5 | 17.5 | 18.0 | 18.0 | 18.5 | 18.0 | 30.0 | 40.0 | 45.0 | 18.0 |
| magnetic characteristics | | | | | | | | | | |
| BM (max. magnetic flux density) (G/g) | 220 | 290 | 270 | 340 | 255 | 190 | 230 | 280 | 350 | 180 |
| HC (coercive force) (Oe) | 110 | 60 | 70 | 6 | 65 | 120 | 90 | 70 | 6 | 130 |
| HM (max. magnetomotive force) (KOe) | 3.5 | 3.5 | 3.5 | 3.5 | 3.5 | 3.5 | 3.5 | 3.5 | 3.5 | 3.5 |

Note:
*[1] the composition of the magnetic fine particle was analyzed by X-ray diffractometry.
*[2] the content was determined by the combustion method.
*[3] the particle diameter was determined on the basis of electron photomicrographs.

On the other hand, in Run No. 22 which is a comparative example, the characteristics of the sample are the same as those of the original sample due to the fact that no satisfactory reducing effect can be attained because the temperature of the heat treatment is low. In Run Nos. 23 to 25 wherein heat treatment was conducted at a high temperature, the fine particle of iron is fused and grows into a large particle although the magnetic performance can be improved because the fine particle of iron is reduced.

EXAMPLE 6

(method of modifying magnetic carbon black)

The samples of Run No. 20 and Run No. 25 of Example 5 were heat treated in the air at 300° C., and the changes in the compositions of the samples were compared with each other. The composition of the sample of Run No. 20 was maintained as it is, i.e., comprised $\alpha$-Fe, even after heat treatment for 500 hr. On the other hand, the composition of the sample of Run No. 25 was converted into FeO by the heat treatment for about 24 hr and then oxidized into $Fe_3O_4$ and $\gamma$-$Fe_2O_3$.

We claim:

1. A process for preparing magnetic carbon black comprising carbon black and a magnetic fine particle dispersed and immobilized therein, which comprises the steps of:
   (A) burning a fuel to form a high temperature combustion gas;
   (B) feeding, as a starting material for producing said carbon black, a hydrocarbon and at least one organometallic compound of at least one metal selected from the group consisting of iron, cobalt and nickel into a stream of said high temperature combustion gas travelling at a velocity of at least about 150 m/sec.;
   (C) feeding an oxygen gas from a position that is circumferential to the hydrocarbon feed to promote the thermal decomposition of the hydrocarbon and the production of small particulate carbon black; and
   (D) cooling the resultant reaction mixture and separating particulate magnetic carbon black therefrom.

2. The process according to claim 1 wherein said at least one organometallic compound is a metallocene.

3. The process according to claim 1 wherein said at least one organometallic compound is a carbonyl complex compound.

4. The process according to claim 1, wherein said hydrocarbon used as the starting material of carbon black is an aromatic hydrocarbon.

5. The process according to claim 1, wherein said hydrocarbon used as the starting material of carbon black is at least one oil selected from the group consisting of coal tar oil and bottom oil of ethylene cracking.

6. A process for preparing magnetic carbon black comprising carbon black and a magnetic fine particle dispersed and immobilized therein, which comprises the steps of:
   (A) burning a fuel to form a high temperature combustion gas stream containing free oxygen;
   (B) feeding, as a starting material for producing said carbon black, a hydrocarbon into the stream of said high temperature combustion gas to form carbon black;
   (C) at a point downstream of step B, feeding a gas comprising hydrogen and at least one transition metal compound of at least one of iron, cobalt and nickel into said high temperature combustion gas stream containing carbon black to form particulate magnetic carbon black; and
   (D) cooling the resulting reaction mixture and separating the particulate magnetic carbon black therefrom.

7. The process according to claim 6, wherein said transition metal compound is at least one compound selected from the group consisting of metallocenes, carbonyl complex compounds, inorganic acid salts, and organic acid salts of at least one of Fe, Co, and Ni.

8. The process according to claim 6, wherein said hydrocarbon used as the starting material of carbon black is an aromatic hydrocarbon.

9. The process according to claim 6, wherein said hydrocarbon used as the starting material of carbon black is an oil selected from the group consisting of coal tar oil and bottom oil of ethylene cracking.

10. A process for preparing magnetic carbon black comprising carbon black and a magnetic fine particle dispersed and immobilized therein, which comprises the steps of:
   (A) burning a fuel to form a high temperature combustion gas stream;
   (B) feeding, as a starting material for producing said carbon black, a hydrocarbon into said high temperature combustion gas stream at two downstream locations, the hydrocarbon being converted to carbon black at these locations;
   (C) feeding at least one transition metal compound of at least one of iron, cobalt and nickel into said high temperature combustion gas stream at a location intermediate said two downstream locations to effect formation of particulate magnetic carbon black; and
   (D) cooling the resulting reaction mixture and separating the particulate magnetic carbon black therefrom.

11. The process according to claim 10, wherein said transition metal compound is at least one compound selected from the group consisting of metallocenes, carbonyl complex compounds, inorganic acid salts, and organic acid salts of at least one of Fe, Co, and Ni.

12. The process according to claim 10, wherein said hydrocarbon used as the starting material of carbon black is an aromatic hydrocarbon.

13. The process according to claim 10, wherein said hydrocarbon used as the starting material of carbon black is an oil selected from the group consisting of coal tar oil and bottom oil of ethylene cracking.

* * * * *